US009031318B2

(12) United States Patent
Sato

(10) Patent No.: US 9,031,318 B2
(45) Date of Patent: May 12, 2015

(54) GUIDANCE DEVICE, GUIDANCE METHOD, AND GUIDANCE PROGRAM

(75) Inventor: Yuji Sato, Owariasahi (JP)

(73) Assignee: Aisin AW Co., Ltd., Anjo (JP)

( * ) Notice: Subject to any disclaimer, the term of this patent is extended or adjusted under 35 U.S.C. 154(b) by 148 days.

(21) Appl. No.: 13/821,479

(22) PCT Filed: Jan. 11, 2012

(86) PCT No.: PCT/JP2012/000111
§ 371 (c)(1),
(2), (4) Date: Mar. 7, 2013

(87) PCT Pub. No.: WO2012/101965
PCT Pub. Date: Aug. 2, 2012

(65) Prior Publication Data
US 2013/0163865 A1 Jun. 27, 2013

(30) Foreign Application Priority Data
Jan. 27, 2011 (JP) ................................. 2011-015736

(51) Int. Cl.
*G06K 9/00* (2006.01)
*G06T 11/00* (2006.01)
*G01C 21/36* (2006.01)
(52) U.S. Cl.
CPC .......... *G06T 11/001* (2013.01); *G01C 21/3602* (2013.01); *G01C 21/3644* (2013.01); *G06K 9/00818* (2013.01)
(58) Field of Classification Search
None
See application file for complete search history.

(56) References Cited

U.S. PATENT DOCUMENTS

| 6,542,639 | B2 * | 4/2003 | Konoshima et al. | 382/218 |
| 6,968,084 | B2 * | 11/2005 | Satoh | 382/190 |
| 7,454,065 | B2 * | 11/2008 | Satoh | 382/190 |
| 2006/0233424 | A1 * | 10/2006 | Miyajima et al. | 382/104 |
| 2008/0273757 | A1 * | 11/2008 | Nakamura et al. | 382/104 |

(Continued)

FOREIGN PATENT DOCUMENTS

JP    A-2009-205559    9/2009

OTHER PUBLICATIONS

Apr. 20, 2012 International Search Report issued in International Patent Application No. PCT/JP2012/000111.

(Continued)

*Primary Examiner* — Bernard Krasnic
(74) *Attorney, Agent, or Firm* — Oliff PLC

(57) ABSTRACT

A mark object that serves as a marker for a guidance point on a set route is specified, and coloration information related to a coloration of the mark object is acquired. Based on the coloration information, a correction information creating object before the mark object on the route having a coloration similar to the coloration of the mark object is specified. An image of the correction information creating object while a vehicle travels the route is acquired as a correcting image, and color correction information is calculated based on acquired color information and existing color information. A recognition template is then corrected based on the calculated color correction information to create a correction template. Thus, because the recognition template used for recognizing the mark object is corrected to a color more closely resembling the actual appearance of the mark object, the recognition accuracy of the mark object can be improved.

8 Claims, 8 Drawing Sheets

(56) References Cited

U.S. PATENT DOCUMENTS

| | | |
|---|---|---|
| 2010/0040289 A1* | 2/2010 | Irie et al. .................... 382/195 |
| 2010/0250126 A1 | 9/2010 | Epshtein et al. |
| 2010/0329513 A1 | 12/2010 | Klefenz |
| 2013/0170706 A1* | 7/2013 | Mori et al. .................... 382/103 |

OTHER PUBLICATIONS

Apr. 20, 2012 Written Opinion issued in International Patent Application No. PCT/JP2012/000111.

* cited by examiner

GUIDANCE DEVICE, GUIDANCE METHOD, AND GUIDANCE PROGRAM

This application is the National Phase of International Application No. PCT/JP2012/000111, filed on Jan. 11, 2012, which claims foreign priority to Japanese Patent Application No. 2011-015736, filed on Jan. 27, 2011.

TECHNICAL FIELD

The present invention relates to a guidance device, a guidance method, and a guidance program.

BACKGROUND ART

There is known art that uses, for example, a camera or the like to capture an image of a feature in a surrounding area of a vehicle, and recognizes the captured image. However, the appearance of the captured feature may vary depending on the time of day, weather, and the like. Therefore, according to Japanese Patent Application Publication No. JP-A-2009-205559, the luminance of a road marking is corrected in consideration of the time, weather, and shadows.

SUMMARY OF INVENTION

However, the appearance of the captured feature in reality changes depending on various factors, and such changes are not fully considered when simply correcting the luminance based on conditions such as the time, weather, and shadows.

The present invention was devised in view of the foregoing problem, and provides a guidance device, a guidance method, and a guidance program capable of improving a recognition accuracy of a mark object.

A guidance device according to a first aspect of the present invention includes: a mark object specification unit that specifies a mark object that serves as a marker for a point that should be guided on a set route; a coloration information acquisition unit that acquires coloration information related to a coloration of the mark object; a correction information creating object specification object that, based on the coloration information, specifies a correction information creating object before the mark object on the route, the correction information creating object having a coloration similar to the coloration of the mark object; an image acquisition unit that acquires an image of the correction information creating object during travel on the route as a correcting image; a color correction information calculation unit that, based on acquired color information related to a color obtained by analyzing the acquired correcting image and based on existing pre-stored color information related to a color of the correction information creating object, calculates color correction information related to correcting a color of a pre-stored recognition template used for recognizing the mark object; and a correction template creation unit that creates a correction template by correcting the recognition template based on the color correction information. Thus, based on the image of the correction information creating object before the mark object during travel, the recognition template used for recognizing the mark object is corrected to create the correction template. Therefore, the colors of the correction template more closely reflect the actual appearance of the mark object, and can improve the recognition accuracy of the mark object.

According to a second aspect of the present invention, the guidance device further includes: a post-correction image recognition unit that recognizes the mark object using the correction template; and a pre-correction image recognition unit that recognizes the mark object using the recognition template prior to correction based on the color correction information if the mark object cannot be recognized by the post-correction image recognition unit. By thus correcting the recognition template, a reduction in recognition accuracy can be suppressed.

According to a third aspect of the present invention, the guidance device further includes: a recognition determination unit that performs image recognition processing on an image of a surrounding area of the vehicle when a distance to the correction information creating object is equal to or less than a prescribed distance, and determines whether the correction information creating object can be recognized. In addition, the image acquisition unit acquires the image of the correction information creating object based on the image of the surrounding area as the correcting image if the recognition determination unit determines that the correction information creating object can be recognized. Thus, the correcting image can be suitably acquired.

According to a fourth aspect of the present invention, if there is an object identical to the mark object closer to the mark object than the correction information creating object used to create the already created correction template, the correction template creation unit newly creates the correction template using the identical object. Thus, because the correction template is created based on the same object as the mark object, the recognition accuracy of the mark object can be further improved.

According to a fifth aspect of the present invention, if a prescribed time has elapsed since creation of the already created correction template, the correction template creation unit newly creates the correction template using the correction information creating object located closer to the mark object than the correction information creating object used to create the already created correction template. Thus, because the correction template is created in consideration of changes in the appearance of the mark object due to the passage of time, the recognition accuracy of the mark object can be further improved.

According to a sixth aspect of the present invention, the prescribed time is set depending on a time period during which the mark object is recognized. Thus, because the prescribed time is set short during times when the appearance of the mark object can dramatically change in a short period of time such as, for example, the early morning or evening, the recognition template is corrected to colors that more closely reflect the actual appearance of the mark object, which can further improve the recognition accuracy of the mark object.

According to a seventh aspect of the present invention, in comparison with an angular difference between a placement angle of the correction information creating object used to create the already created correction template and a placement angle of the mark object, if there is a smaller angular difference between a placement angle of the correction information creating object closer to the mark object than the correction information creating object used to create the already created correction template and the placement angle of the mark object, the correction template creation unit newly creates the correction template using the correction information creating object that has the smaller angular difference with the mark object. By thus considering changes in the appearance of the mark object due to the angle at which the mark object is placed, the recognition accuracy of the mark object can be improved.

A guidance method according to an eighth aspect of the present invention includes the steps of: specifying a mark object that serves as a marker for a point that should be guided on a set route; acquiring coloration information related to a coloration of the mark object; specifying, based on the coloration information, a correction information creating object before the mark object on the route, the correction information creating object having a coloration similar to the coloration of the mark object; acquiring an image of the correction information creating object during travel on the route as a correcting image; calculating, based on acquired color information related to a color obtained by analyzing the acquired correcting image and based on existing pre-stored color information related to a color of the correction information creating object, color correction information related to correcting a color of a pre-stored recognition template used for recognizing the mark object; and creating a correction template by correcting the recognition template based on the color correction information.

The guidance method described above obtains the same effects as the guidance device according to the first aspect of the present invention.

A guidance program according to a ninth aspect of the present invention performs in a computer the functions of: specifying a mark object that serves as a marker for a point that should be guided on a set route; acquiring coloration information related to a coloration of the mark object; specifying, based on the coloration information, a correction information creating object before the mark object on the route, the correction information creating object having a coloration similar to the coloration of the mark object; acquiring an image of the correction information creating object during travel on the route as a correcting image; calculating, based on acquired color information related to a color obtained by analyzing the acquired correcting image and based on existing pre-stored color information related to a color of the correction information creating object, color correction information related to correcting a color of a pre-stored recognition template used for recognizing the mark object; and creating a correction template by correcting the recognition template based on the color correction information.

The guidance program described above obtains the same effects as the guidance device according to the first aspect of the present invention.

DESCRIPTION OF EMBODIMENTS

Hereinafter, a guidance device according to an embodiment of the present invention will be described on the basis of the drawings.

First Embodiment

Figure 1:
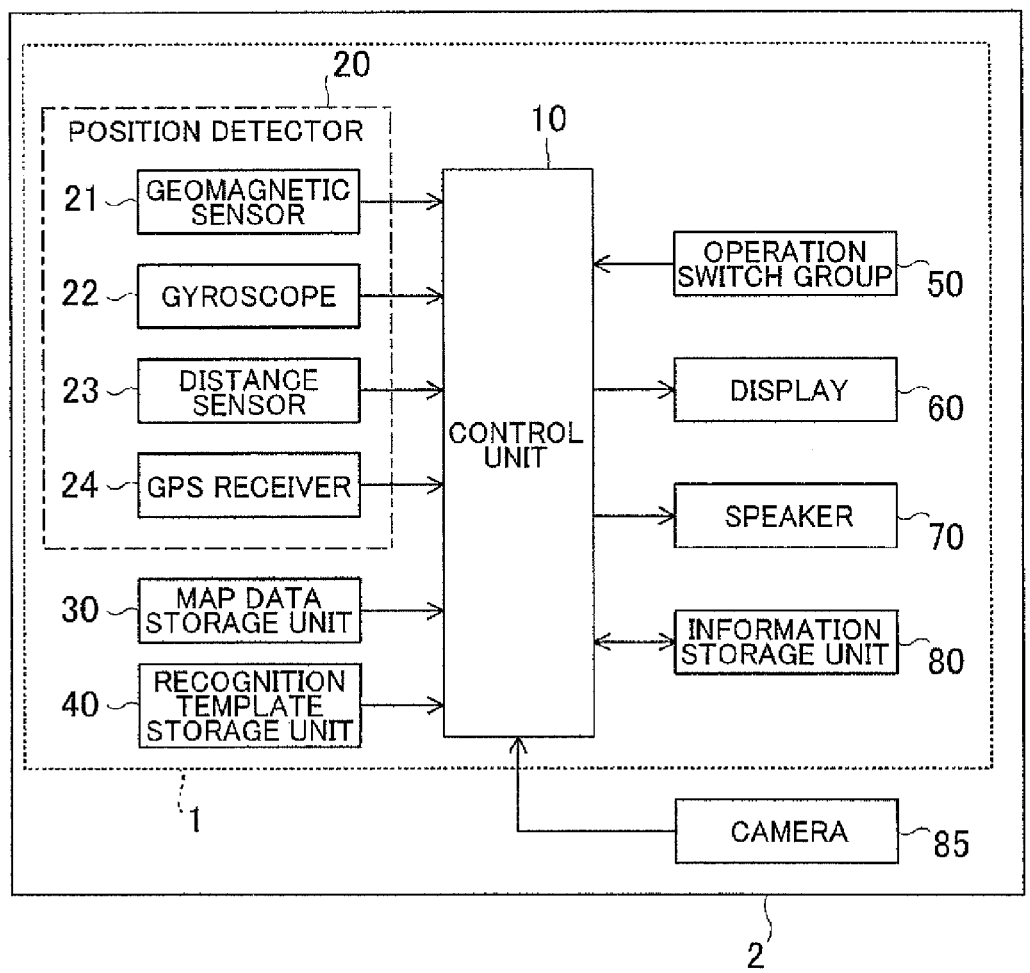
FIG. 1 is a block diagram that shows the constitution of a guidance device according to an embodiment of the present invention.

As shown in FIG. 1, an in-vehicle device 1 serving as the guidance device is installed in a vehicle 2.

Although the in-vehicle device 1 is a so-called in-vehicle navigation device here, the in-vehicle device 1 is not limited to the in-vehicle navigation device and may be, for example, a mobile telephone, a personal computer, or the like. The in-vehicle device 1 is constituted around a control unit 10 and includes a position detector 20, a map data storage unit 30, a recognition template storage unit 40, an operation switch group 50, a display 60, a speaker 70, and an information storage unit 80, all of which are connected to the control unit 10.

The control unit 10 is constituted by a normal computer including a CPU, a ROM, a RAM, an I/O, a bus line connecting these components, and so on.

The position detector 20 includes a geomagnetic sensor 21, a gyroscope 22, a distance sensor 23, and a GPS (Global Positioning System) receiver 24 that receives radio waves from a satellite, all of which are well known. These sensors 21 to 24 and so on respectively possess different property errors, and are therefore interpolated to each other for use.

The map data storage unit 30 is a storage device realized by a hard disk drive (HDD), for example. Note that although an HDD is used in this embodiment, another medium such as a DVD-ROM or a memory card may be used instead. The map data storage unit 30 stores so-called map matching data for improving the precision of position detection, and map data for finding routes. Various types of data are included in the map data, and facility information related to facilities is included as one such type of data. Specifically, the facility information is point of interest (POI) information that is stored associated with an ID identifying a facility. The POI information includes such information as a facility name, facility ID, position coordinates, type (category), address, and telephone number. The map data also includes node data related to nodes, and link data related to roads (links). Each node is stored associated with landmark information related to a landmark, which is a feature used for guidance at the node. The landmark may be a structure, a facility sign, or a road sign, for example, near the node. The landmark information includes angle information related to an angle at which the landmark is placed. The angle information is related to an angle defined clockwise from north, which is designated as zero degrees, for example, and a direction in which the landmark is placed.

The recognition template storage unit 40 is constituted by the same HDD as the map data storage unit 30. Obviously, another medium such as a memory card may be used instead. The recognition template storage unit 40 stores a recognition template for recognizing the landmark. The recognition template is in color, and the color-related information is defined by RGB values. Note that the recognition template may be image data or feature amount data.

The operation switch group 50 is constituted by touch switches or mechanical switches formed integrally with the display 60, a remote control device, or similar, and is used to perform various types of input.

The display 60 is a color display device that includes a screen constituted using liquid crystal or the like. Maps, facility information, and so forth are displayed via the display 60. The speaker 70 is used for voice output such as voice route guidance.

The information storage unit 80 is used to store an image captured by a camera 85 and a correction template that is a corrected recognition template. The information storage unit 80 is constituted by the same HDD as the map data storage unit 30. Obviously, another medium such as a memory card may be used instead.

The control unit 10 is connected to the camera 85. The camera 85 captures an image of the surrounding area of the vehicle 2. The camera 85 of the present embodiment is a front camera that captures an image of an area in front of the vehicle 2.

According to the present embodiment, the recognition template is corrected and the correction template is created in order to recognize a mark object with high accuracy, which serves as a marker for a point that should be guided on a set route.

Figure 2:
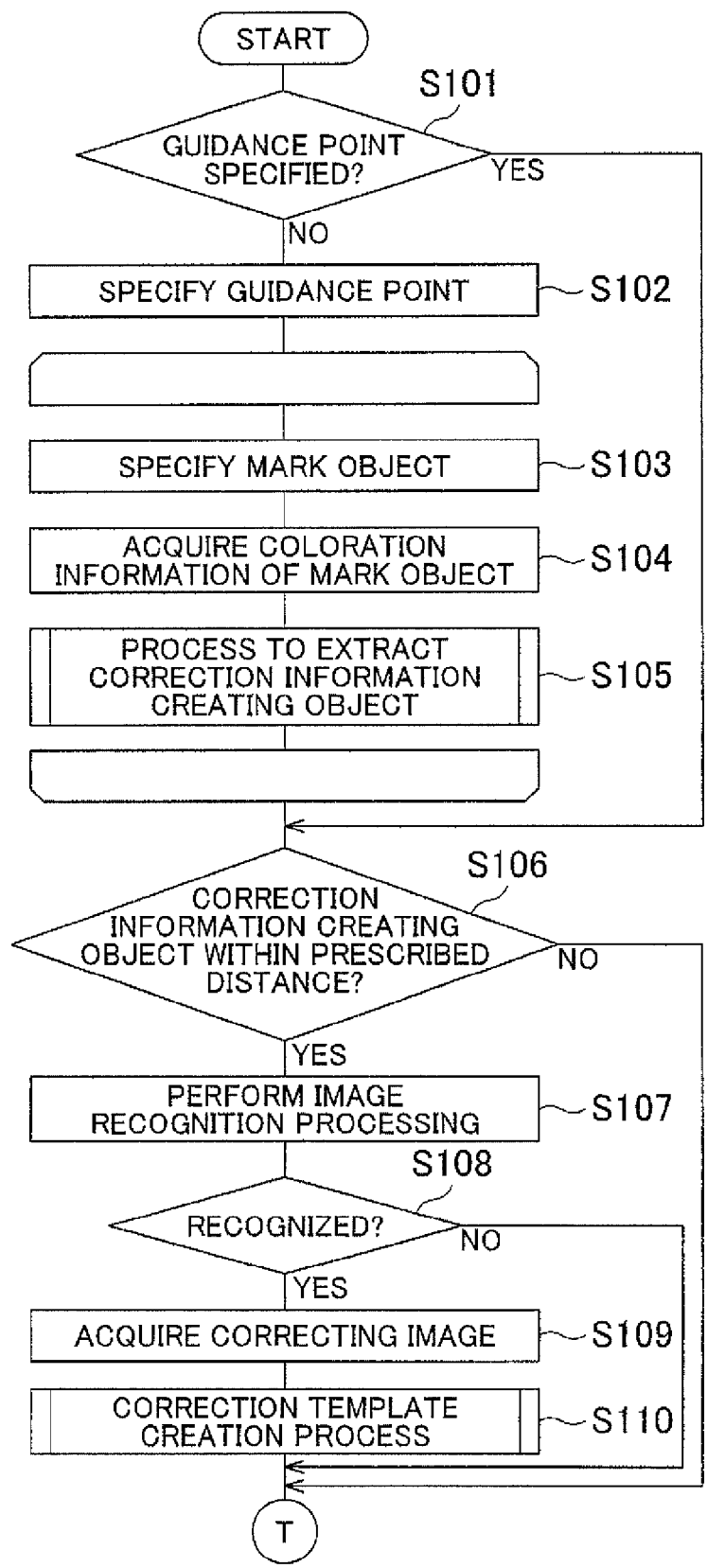
FIG. 2 is a flowchart that illustrates a guidance process according to the embodiment of the present invention.
Figure 3:
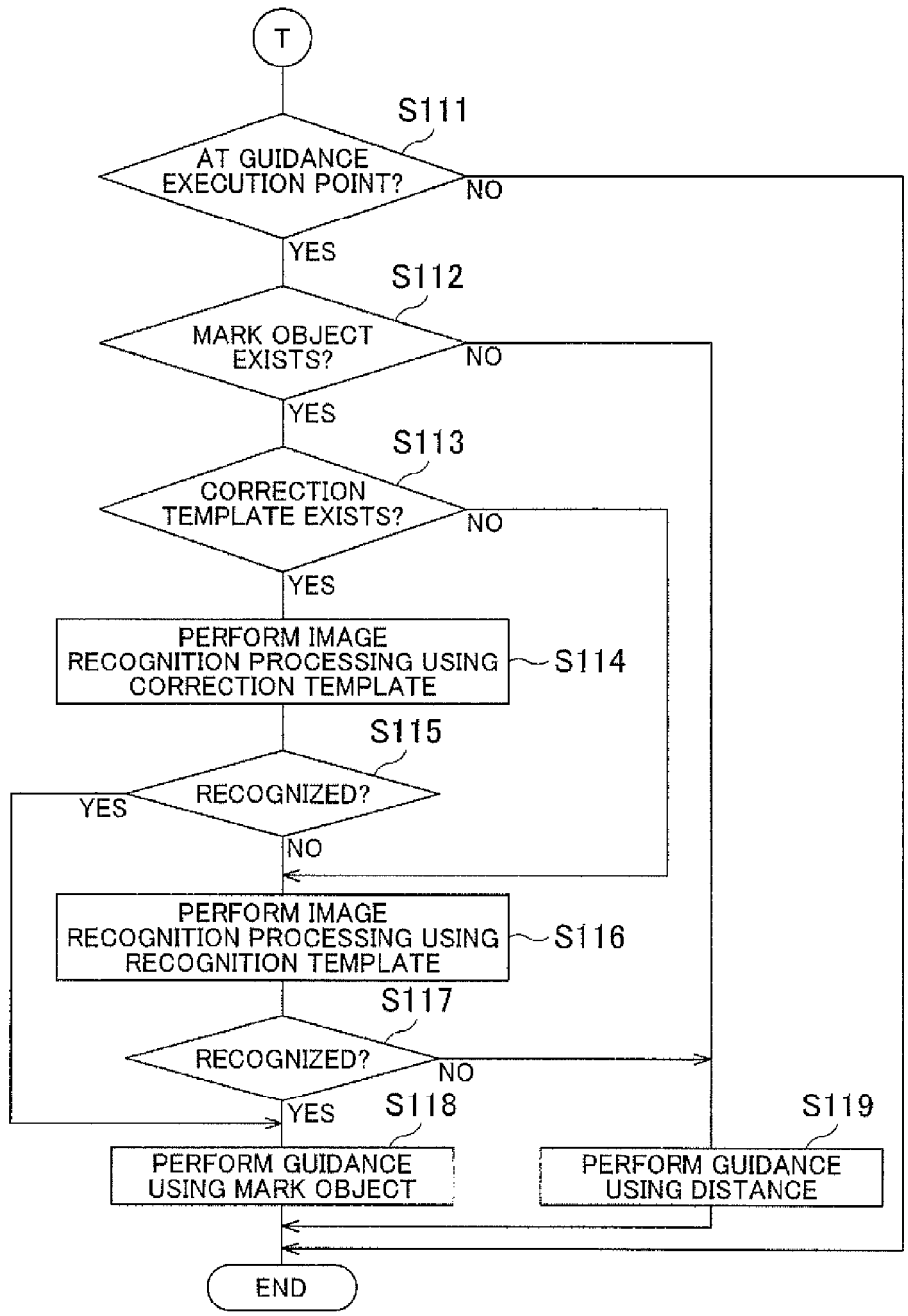
FIG. 3 is a flowchart that illustrates the guidance process according to the embodiment of the present invention.

Here, a guidance process according to the present embodiment will be described on the basis of FIGS. 2 and 3. Note that the guidance process shown in FIGS. 2 and 3 is processing executed at a prescribed interval when a route is set and traveled.

First, at a step S101 (hereafter, "step" will be omitted and the symbol "S" will be used alone), it is determined whether a point that should be guided (hereafter, "guidance point") on the route is specified. The guidance point may be an intersection at which the vehicle traveling along the route should turn right or left, for example. This determination is made based on whether a guidance point specification flag, which is set at S102, is currently set. If a guidance point is specified on the route (S101: Yes), the routine advances to S106. If a guidance point is not specified on the route (S101: No), the routine advances to S102.

At S102, a guidance point on the route is specified, and the guidance point specification flag is set. Note that if the vehicle leaves the route and reroute processing is performed, the guidance point specification flag is reset.

The processing at S103 to S105 is executed for each guidance point specified at S102.

At S103, a mark object that serves as a marker for the guidance point is specified. The mark object according to the present embodiment is a landmark that is stored associated with a particular guidance point.

Figure 6A:
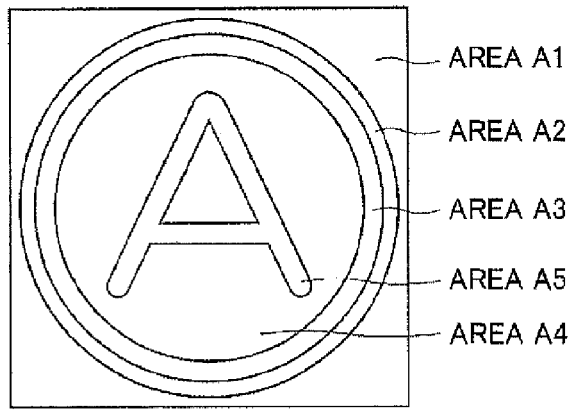
FIG. 6A is an explanatory diagrams that illustrate recognition templates used for image recognition according to the embodiment of the present invention.

At S104, coloration information for the mark object is acquired. For example, if the mark object is the sign of a convenience store A, (hereafter, "store A"), the coloration of the sign of the store A is acquired. According to the present embodiment, the color components in each area of the recognition template of the store A are extracted, and the coloration information is acquired by specifying the coloration in each area based on RGB values. As an example, FIG. 6A shows the recognition template based on the sign of the store A, wherein an area A1 is white, an area A2 is red, an area A3 is orange, an area A4 is white, and an area A5 is red. In this case, red, white, and orange are acquired as the coloration information.

At S105 in FIG. 2, a process to extract a correction information creating object is performed.

Figure 4:
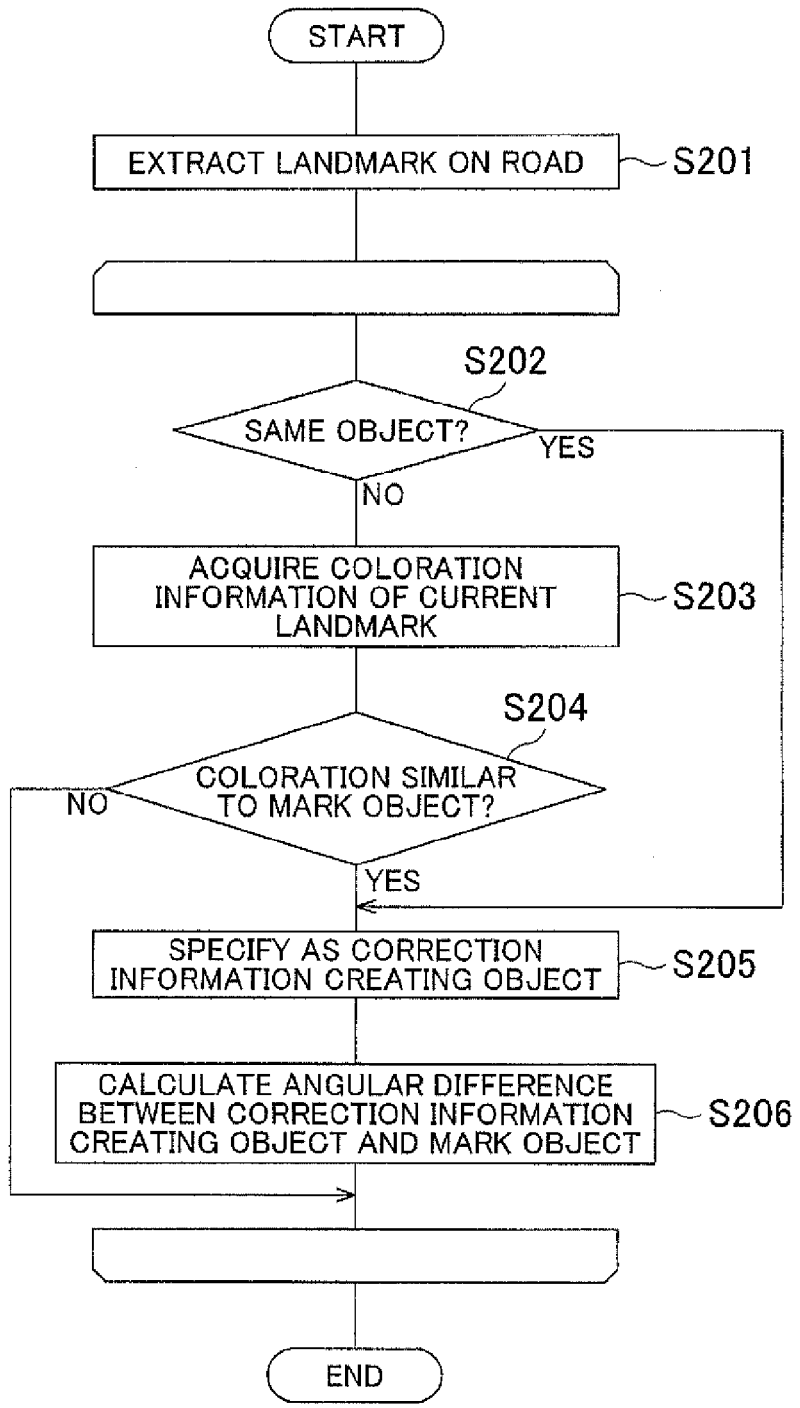
FIG. 4 is a flowchart that illustrates a process to extract a correction information creating object according to the embodiment of the present invention.

Here, the process to extract a correction information creating object will be described on the basis of a sub flow shown in FIG. 4.

At S201, a landmark that is on the set route before the guidance point is extracted.

The processing at S202 to S205 is executed for each landmark extracted at S102.

At S202, it is determined whether the extracted landmark (hereafter, "current landmark") is the same object as the mark object. In the example of the sign of the store A as the mark object, if the current landmark is the sign of the store A, it is determined that the current landmark and the mark object are the same object, but if the current landmark is a different feature, it is determined that the current landmark and the mark object are not the same object. If it is determined that the current landmark is the same object as the mark object (S202: Yes), the routine advances to S205. If it is determined that the current landmark is not the same object as the mark object (S202: No), the routine advances to S203.

At S203, the coloration information for the current landmark is acquired. The acquisition of the coloration information for the landmark is identical to the acquisition of the coloration information for the mark object explained at S104.

Figure 6B:
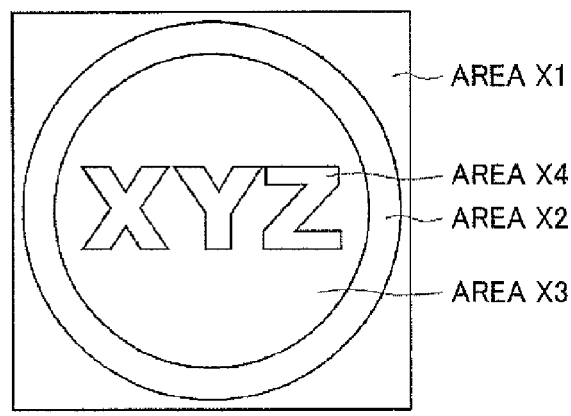
FIG. 6B is an explanatory diagrams that illustrate recognition templates used for image recognition according to the embodiment of the present invention.

At S204, it is determined whether the coloration of the current landmark is a coloration similar to the coloration of the mark object. As an example, the mark object is the sign of the store A, and the recognition template is as shown in FIG. 6A, wherein the area A1 is white, the area A2 is red, the area A3 is orange, the area A4 is white, and the area A5 is red. Meanwhile, the current landmark is the sign of a gas station XYZ, and the recognition template is as shown in FIG. 6B, wherein an area X1 is orange, an area X2 is red, an area X3 is orange, and an area X4 is white. In such case, it is determined that the coloration of the sign of the gas station XYZ is a coloration similar to the coloration of the mark object. If it is determined that the coloration of the current landmark is not a coloration similar to the coloration of the mark object (S204: No), the processing at S205 and S206 is not performed. If it is determined that the coloration of the current landmark is a coloration similar to the coloration of the mark object (S204: Yes), the routine advances to S205.

At S205 to which the routine advances if it is determined that the current landmark is the same object as the mark object (S202: Yes) or determined that the coloration of the current landmark is a coloration similar to the coloration of the mark object (S204: Yes), the current landmark is specified as a correction information creating object and stored in the information storage unit 80 as associated with the mark object. Note that if the landmark is the same object as the mark object, the coloration of the landmark is similar (identical) to the coloration of the mark object, and thus specified as the correction information creating object.

At S206, mark angle information related to an angle at which the mark object is placed is acquired from the map data storage unit 30, and information related to an angle at which the current landmark is placed is acquired as correction information creating object angle information from the map data storage unit 30. Based on the mark angle information and the correction information creating object angle infatuation, an angular difference is calculated between the placement angle of the mark object and the placement angle of the correction information creating object.

After the processing at S202 to S206 is completed for all extracted landmarks, the process to extract the correction information creating object is ended.

Returning to FIG. 2, after the processing at S103 to S105 is completed for all specified guidance points, the routine advances to S106.

At S106, it is determined whether a distance to the correction information creating object for which a correction template creation process end flag (described later) is not set is within a prescribed distance (e.g., 300 meters). Note that the prescribed distance is appropriately set based on the performance of the camera 85 and the like. If the distance to the correction information creating object is not within the prescribed distance (S106: No), the routine advances to S111 in FIG. 3. If the distance to the correction information creating object is within the prescribed distance (S106: Yes), the routine advances to S107.

At S107, an image of the surrounding area of the vehicle 2 is captured by the camera 85, and image recognition processing is performed on the captured surrounding area image. In the present embodiment, the surrounding area image of the vehicle 2 is an image of the area in front of the vehicle 2.

At S108, it is determined whether the correction information creating object can be recognized. If the correction information creating object cannot be recognized (S108: No), the routine advances to S111 in FIG. 3. If the correction information creating object can be recognized (S108: Yes), the routine advances to S109.

At S109, the image of the recognized correction information creating object is acquired as a correcting image. Note that if a plurality of correction information creating objects is recognized in the surrounding area image, a correcting image is acquired per correction information creating object. The acquired correcting image is stored in the information storage unit 80.

At S110, a correction template creation process is performed. Note that if a plurality of correction information creating objects is recognized, the correction template creation process is performed per correction information creating object. Further note that, the correction template creation process end flag is set for the correction information creating object for which the correction template creation process is complete.

Here, the correction template creation process will be described on the basis of a sub flow shown in FIG. 5.

At S301, it is determined whether the correction template is already created for the mark object that corresponds to the correction information creating object recognized by image recognition processing performed on the surrounding area image (hereafter, "current correction information creating object"). If the correction template is not created (S301: No), the routine advances to S308. If the correction template is already created (S301: Yes), that is, if the correction template for the mark object that corresponds to the current correction information creating object is stored in the information storage unit 80, the routine advances to S302. Note that the present process is executed while the vehicle travels the route, and therefore the current correction information creating object can be considered closer to the mark object than the correction information creating object used to create the already existing correction template.

At S302, it is determined whether the current correction information creating object is the same object as the mark object. If it is determined that the current correction information creating object is the same object as the mark object (S302: Yes), the routine advances to S308. If it is determined that the current correction information creating object is not the same object as the mark object (S302: No), the routine advances to S303.

At S303, it is determined whether a first prescribed time (e.g., 30 minutes) has elapsed since creation of the correction template. If it is determined that the first prescribed time has elapsed since creation of the correction template (S303: Yes), the routine advances to S308. If it is determined that the first prescribed time has not elapsed since creation of the correction template (S303: No), the routine advances to S304.

At S304, it is determined whether recognition of the mark object occurred during the early morning or evening time. Here, early morning is considered the time period from 6:00 am to 8:00 am and evening is considered the time period from 4:00 pm to 6:00 pm, for example. Note that the early morning and evening times may vary depending on the season, date, and time. In addition, the time at which the mark object is recognized is a predicted passage time when the vehicle 2 passes a point related to the execution of guidance for the guidance point (hereafter, "guidance execution point"). Note that the guidance execution point may be a point set in consideration of various processing times, voice output times, and the like for performing guidance at a prescribed point before the guidance point, and also a point whose distance to the guidance point is a prescribed distance. If it is determined that recognition of the mark object occurred during the early morning or evening time (S304: No), the routine advances to S306. If it is determined that recognition of the mark object occurred during the early morning or evening time (S304: Yes), the routine advances to S305.

At S305, it is determined whether a second prescribed time (e.g., 10 minutes) has elapsed since creation of the correction template. If it is determined that the second prescribed time has elapsed since creation of the correction template (S305: Yes), the routine advances to S308. If it is determined that the second prescribed time has not elapsed since creation of the correction template (S305: No), the routine advances to S306.

At S306, it is determined whether the correction information creating object used to create the correction template stored in the information storage unit 80 is the same object as the mark object. This determination is made based on whether an identity flag (described later) is set. If it is determined that the correction information creating object used to create the correction template is the same object as the mark object (S306: Yes), the correction template creation process is ended. If it is determined that the correction information creating object used to create the correction template is not the same object as the mark object (S306: No), the routine advances to S307.

At S307, it is determined whether an angular difference between the mark object and the current correction information creating object is less than an angular difference between the mark object and the correction information creating object used to create the correction template stored in the information storage unit 80. If it is determined that the angular difference between the mark object and the current correction information creating object is equal to or greater than the angular difference between the mark object and the correction information creating object used to create the correction template (S307: No), the correction template creation process is ended. If it is determined that the angular difference between the mark object and the current correction information creating object is less than the angular difference between the mark object and the correction information creating object used to create the correction template (S307: Yes), the routine advances to S308.

Figure 6C:
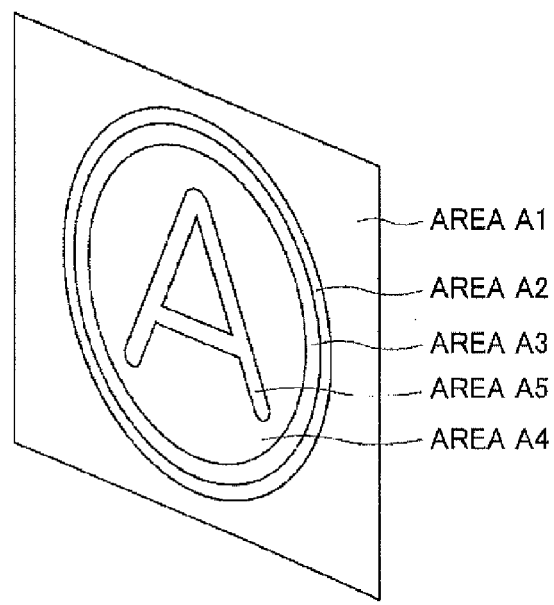
FIG. 6C is an explanatory diagrams that illustrate recognition templates used for image recognition according to the embodiment of the present invention.

For example, the same sign of the store A when placed as shown in FIG. 6A and placed as shown in FIG. 6C is highly likely to appear a different shade of color due to differences in how the sunlight hits the sign and so forth. Hence, in the present embodiment, a determination process related to the processing at S307 is performed to create the correction template using the correction information creating object having a smaller angular difference with respect to the placement angle of the mark object.

The routine advances to S308 if it is determined that the correction template is not created for the mark object that corresponds to the current correction information creating object (S301: No), if it is determined that the current correction information creating object is the same object as the mark object (S302: Yes), if it is determined that the first prescribed time has elapsed since creation of the correction template (S303: Yes), if it is determined that recognition of the mark object occurred during the early morning or evening time and the second prescribed time has elapsed (S304: Yes, and S305: Yes), or if it is determined that the correction information creating object used to create the correction template is not the same object as the mark object and that the angular difference between the mark object and the current correction information creating object is less than the angular difference between the mark object and the correction information creating object used to create the correction template (S306: No, and S307: Yes). At S308, the correcting image of the current correction information creating object that is acquired at S109 and stored in the information storage unit 80 is analyzed and acquired color information is calculated. The acquired color information is calculated per color. In the present embodiment, for the acquired color information, the RGB values are calculated per color. For example, if the coloration of the correction information creating object is red, white, and orange, an image analysis is performed for an area that corresponds to the one color of red, and the RGB values are calculated. The RGB values are similarly calculated for white and orange.

At S309, based on the existing color information, which is information related to the colors of the recognition template of the current correction information creating object stored in the recognition template storage unit 40, and based on the acquired color information calculated at S308, color correction information for correcting the recognition template of the mark object is calculated per color. According to the present embodiment, the color correction information is calculated as difference values between the RGB values of the existing color information and the RGB values of the acquired color information.

As S310, based on the color correction information calculated at S309, the correction template that corrects the colors of the recognition template of the mark object per color is created. In the present embodiment, the color correction information is the difference values between the RGB values per color. Therefore, the colors of the recognition template are corrected by adding/subtracting the difference values between the RGB values of the color correction information to/from the RGB values per color of the recognition template of the mark object. The created correction template is stored in the information storage unit 80.

At S311, the angular difference calculated at S206 between the placement angle of the current correction information creating object and the placement angle of the mark object is stored in the information storage unit 80 associated with the correction template created at S310. The correction template creation process is then ended. At such time, the time of creation of the correction template is also stored. Further, if the correction information creating object is the same object as the mark object, the identity flag is stored associated with the correction template.

The routine advances to S111 after it is determined that the distance to the correction information creating object for which the correction template creation process end flag (described later) is not set is within the prescribed distance (S106: No), or after the correction template creation process (S110 in FIG. 2). At S111, as shown in FIG. 3, it is determined whether the current position of the vehicle 2 is the guidance execution point. If it is determined that the current position of the vehicle 2 is not the guidance execution point (S111: No), the routine does not perform the processing at S112 onward. If it is determined that the current position of the vehicle 2 is the guidance execution point (S111: Yes), the routine advances to S112.

At S112, it is determined whether there is a mark object that serves as a marker for the guidance point. If it is determined that there is no mark object (S112: No), the routine advances to S119. If it is determined that there is a mark object (S112: Yes), the routine advances to S113.

At S113, it is determined whether the correction template is stored in the information storage unit 80 for the mark object that serves as a marker for the guidance point. If it is determined that the correction template is not stored in the information storage unit 80 (S113: No), the routine advances to S116. If it is determined that the correction template is stored in the information storage unit 80 (S113: Yes), the routine advances to S114.

At S114, an image of the surrounding area of the vehicle 2 is captured by the camera 85, and image recognition processing is performed on the captured surrounding area image using the correction template stored in the information storage unit 80.

At S115, it is determined whether the mark object can be recognized. If it is determined that the mark object can be recognized (S115: Yes), the routine advances to S118. If it is determined that the mark object cannot be recognized (S115: No), the routine advances to S116.

At S116, image recognition processing is performed on the surrounding area image captured at S114, using the recognition template of the mark object stored in the recognition template storage portion 40, that is, the recognition template not corrected by the color correction information.

At S117, it is determined whether the mark object can be recognized. If it is determined that the mark object can be recognized (S117: Yes), the routine advances to S118. If it is determined that the mark object cannot be recognized (S117: No), the routine advances to S119.

The routine advances to S118 if the mark object for the guidance point can be recognized (S115: Yes, or S117: Yes). At S118, guidance is performed for the guidance point using the mark object.

For example, if the mark object is the store A and a right turn is required at the guidance point, guidance is provided through the speaker 70, which may output "Turn right ahead at the store A intersection".

The routine advances to S119 if there is no mark object at the guidance point (S112: No), or if the mark object for the guidance point cannot be recognized (S117: No). At S119, guidance is performed for the guidance point using the distance. For example, if a right turn is required at the guidance point 300 meters ahead, guidance is provided through the speaker 70, which may output "Turn right at the intersection 300 meters ahead".

Here, specific examples of the guidance process will be described based on FIGS. 7 and 8.

Figure 7:
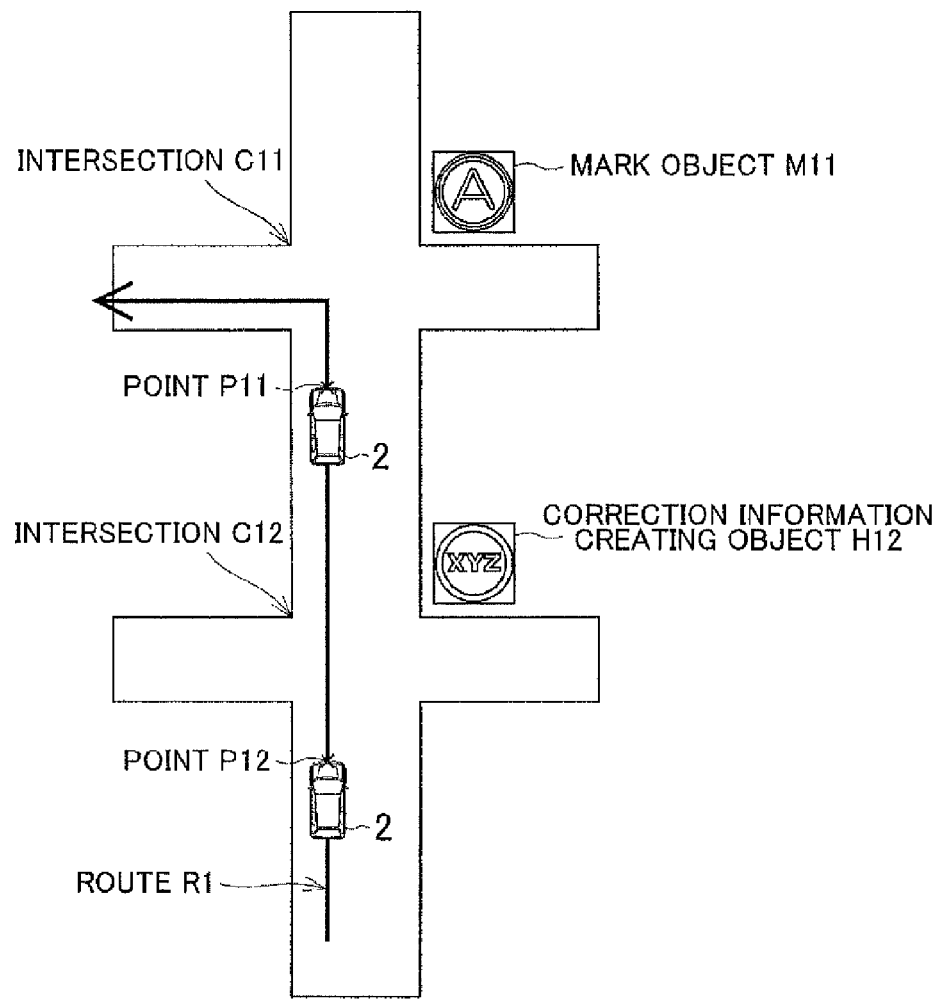
FIG. 7 is an explanatory diagram that illustrates a specific example of the correction template creation process according to the embodiment of the present invention.

As shown in FIG. 7, the vehicle 2 is traveling along a set route R1. There is a left turn in the route R1 at an intersection C11. Therefore, the intersection C11 is specified as a guidance point (S102 in FIG. 2). The store A is located at the intersection C11. Thus, the sign of the store A is specified as a mark object M11 (S103), and red, white, and orange are acquired as the coloration information for the sign of the store A (S104). In addition, the gas station XYZ located at an intersection C12 is extracted as a landmark before the intersection C11 on the route R1 (S201 in FIG. 4). The gas station XYZ is not the same object as the store A (S202: No), and red, white, and orange are acquired as the coloration information for the sign of the gas station XYZ (S203). The coloration of the sign of the gas station XYZ is a coloration similar to that of the sign of the store A that is the mark object M11 (S204: Yes). Therefore, the gas station XYZ at the intersection C12 is specified as a correction information creating object H12 (S205).

When the vehicle 2 reaches a point P12 at which the distance to the intersection C12, where the gas station XYZ specified as a correction information creating object is located, is equal to the prescribed distance (e.g., 300 meters) (S106: Yes), an image of the area in front of the vehicle 2 is captured by the camera 85 and image recognition processing is performed (S107). If the sign of the gas station XYZ located at the intersection C12 can be recognized as a result of the image recognition processing (S108: Yes), the correcting image of the gas station XYZ is acquired (S109) and the correction template creation process is performed (S110). Here, if there is no correction template related to the store A (S301: No in FIG. 5), the correcting image of the gas station XYZ is analyzed to calculate the acquired color information per color (S308), and the color correction information is calculated per color based on the existing color information related to the colors of the recognition template of the gas station XYZ and the calculated acquired color information (S309). Based on the color correction information, a correction template is created that corrects the recognition template based on recognition of the sign of the store A, i.e., the mark object (S310). The angular difference between the placement angle of the sign of the gas station XYZ located at the intersection C12 and the placement angle of the sign of the store A located at the intersection C11 is associated with the correction template, and stored in the information storage unit 80 (S311).

It is assumed here that the vehicle 2 has reached the guidance execution point P11 at which the distance to the intersection C11, i.e., the guidance point, is equal to the prescribed distance (e.g., 300 meters) (S111: Yes in FIG. 3). The store A, i.e., the mark object M11, is located at the intersection C11 (S112: Yes), and the correction template based on recognition of the sign of the store A is created using the image of the gas station XYZ located at the intersection C12 and stored in the information storage unit 80 (S113: Yes). Therefore, image recognition processing is performed using the correction template (S114). Note that correcting the recognition template based on the color correction information conversely risks a reduced recognition rate of the mark object. Therefore, if the store A cannot be recognized using the correction template (S115: No), image recognition processing is performed using the recognition template not corrected by the color correction information (S116). If the store A can be recognized by the image recognition processing (S115: Yes or S117: Yes), guidance related to the intersection C11 such as "Turn left ahead at the store A intersection" is performed using the mark object M11 (S118). If the store A cannot be recognized by the image recognition processing (S117: No), guidance related to the intersection C11 such as "Turn left at the intersection 300 meters ahead" is performed using the distance to the intersection C11 (S119).

Figure 8:
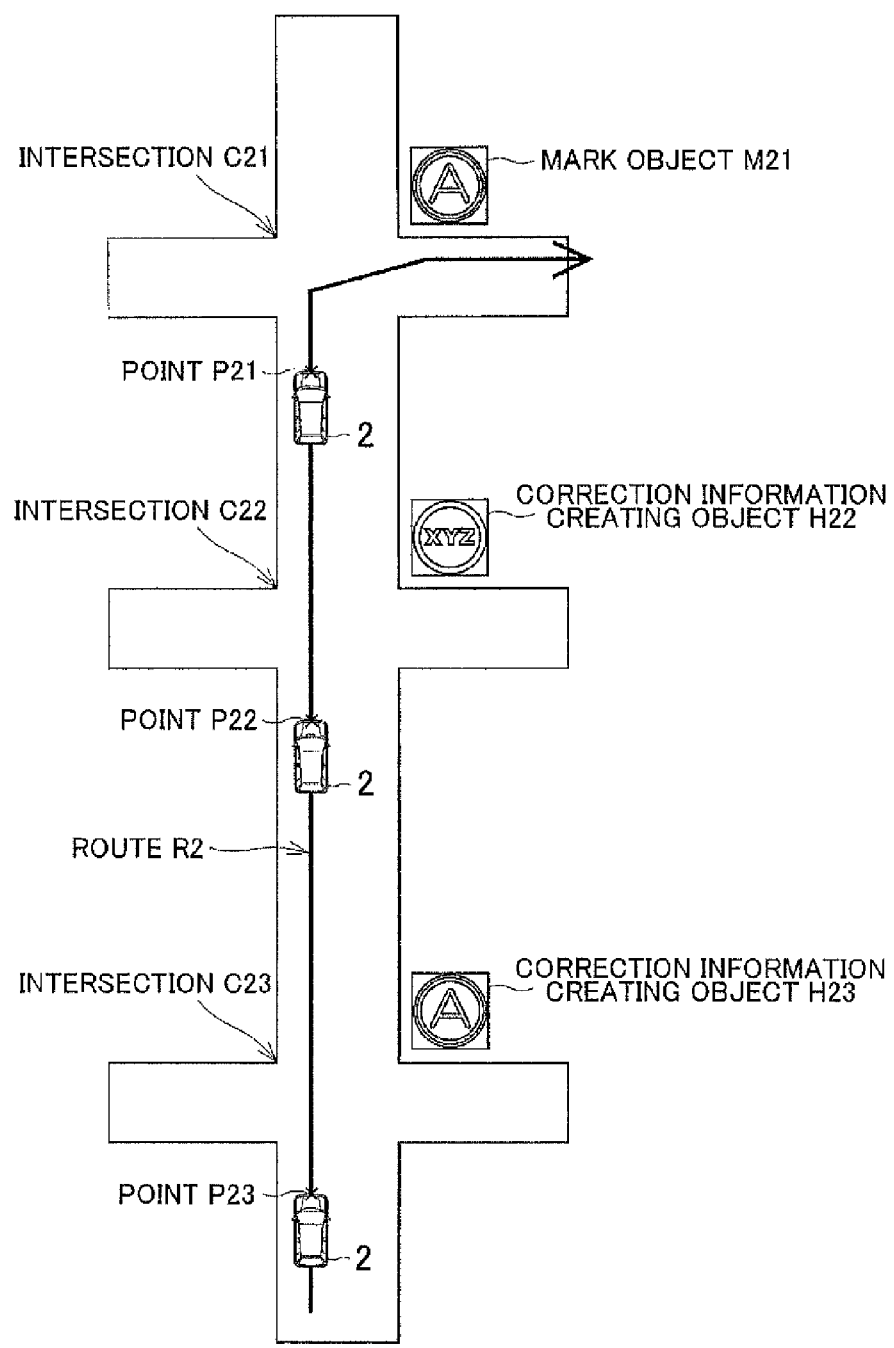
FIG. 8 is an explanatory diagram that illustrates a specific example of the correction template creation process according to the embodiment of the present invention.

Alternatively, as shown in FIG. 8, the vehicle 2 is traveling along a set route R2. There is a right turn in the route R2 at an intersection C21. Therefore, the intersection C21 is specified as a guidance point (S102). The store A is located at the intersection C21. Thus, the sign of the store A is specified as a mark object M21 (S103), and red, white, and orange are acquired as the coloration information for the sign of the store A (S104). In addition, the gas station XYZ located at an intersection C22 and the store A located at an intersection C23 are extracted as landmarks before the intersection C21 on the route R2 (S201). The gas station XYZ located at the intersection C22 is not the same object as the store A (S202: No), and red, white, and orange are acquired as the coloration information for the sign of the gas station XYZ (S203). The coloration of the sign of the gas station XYZ is a coloration similar to that of the sign of the store A that is the mark object M21 (S204: Yes). Therefore, the gas station XYZ at the intersection C22 is specified as a correction information creating object H22 (S205). The store A located at the intersection C23 is the same object as the store A that is the mark object M21 (S202: Yes). Therefore, the store A at the intersection C23 is specified as a correction information creating object H23.

When the vehicle 2 reaches a point P23 at which the distance to the intersection C23, where the store A specified as the correction information creating object H23 is located, is equal to the prescribed distance (e.g., 300 meters) (S106: Yes), an image of the area in front of the vehicle 2 is captured by the camera 85 and image recognition processing is performed (S107). If the sign of the store A located at the intersection C23 can be recognized as a result of the image recognition processing (S108: Yes), the correcting image of the store A is acquired (S109) and the correction template creation process is performed (S110). Here, it is assumed that the correction template related to the store A is already stored in the information storage unit 80 (S301: Yes). The store A located at the intersection C23 is the same object as the mark object M21 (S302: Yes). Therefore, a correction template is created using the correcting image of the store A (S308 to S310). In addition, the angular difference between the placement angle of the sign of the store A located at the intersection C23 and the placement angle of the sign of the store A located at the intersection C21 is associated with this correction template, and stored in the information storage unit 80 (S311). It should be noted that the already stored correction template is overwritten with the correction template newly created based on the store A at the intersection C23, thus updating the correction template.

When the vehicle 2 reaches a point P22 at which the distance to the intersection C22, where the gas station XYZ specified as the correction information creating object H22 is located, is equal to the prescribed distance (e.g., 300 meters), an image of the area in front of the vehicle 2 is captured by the camera 85 (S107). If the sign of the gas station XYZ located at the intersection C22 can be recognized as a result of the image recognition processing (S108: Yes), the correcting image of the gas station XYZ is acquired (S109) and the correction template creation process is performed (S110). At such time, the correction template created using the image of the store A located at the intersection C23 is stored in the information storage unit 80 (S301: Yes). The gas station XYZ is not the same object as the mark object M21 (S302: No). Therefore, it is determined whether the first prescribed time (e.g., 30 minutes) has elapsed since creation of the correction template stored in the information storage unit 80 (S303). If it is determined that the first prescribed time has elapsed since creation of the correction template (S303: Yes), a correction template is created using the correcting image of the gas station XYZ (S308 to S310). In addition, the angular difference between the placement angle of the sign of the gas station XYZ located at the intersection C22 and the placement angle of the sign of the store A located at the intersection C21 is associated with the correction template, and stored in the information storage unit 80 (S311).

If the first prescribed time has not elapsed since creation of the correction template (S303: No), the predicted passage time at which the vehicle 2 passes through the guidance execution point P21, which is a point at which the mark object M21 at the intersection C21 is recognized, is the early morning or evening time (S304: Yes), and the second prescribed time (e.g., 10 minutes) has elapsed since creation of the correction template (S305: Yes), a correction template is created using the correcting image of the gas station XYZ (S308 to S310). In addition, the angular difference between the placement angle of the sign of the gas station XYZ located at the intersection C22 and the placement angle of the sign of the store A located at the intersection C21 is associated with the correction template, and stored in the information storage unit 80 (S311). It should be noted that the correction template created based on the store A at the intersection C23 is overwritten with the correction template created based on the gas station XYZ at the intersection C22, thus updating the correction template.

In the present embodiment, during time periods when the appearance of the mark object can dramatically change such as in the early morning or evening, the interval for updating the correction template is set short so that the correction template is created using the correction information creating object closer to the mark object, which improves the recognition accuracy of the mark object.

If the first prescribed time has not elapsed since creation of the correction template (S303: No), the predicted passage time at which the vehicle 2 passes through the guidance execution point P21, which is a point at which the mark object M21 at the intersection C21 is recognized, is not the early morning or evening time (S304: No), and in this example, the correction information creating object used to create the correction template is the same object as the mark object (S306: Yes), a correction template is not created using the correcting image of the gas station XYZ at the intersection C22. That is, the correction template is not updated, and the correction template created using the sign of the store A at the intersection C23 is kept.

Note that, even in cases where the first prescribed time has not elapsed since creation of the correction template (S303: No) and the predicted passage time at which the vehicle 2 passes through the guidance execution point P21, which is a point at which the mark object M21 at the intersection C21 is recognized, is not the early morning or evening time (S304: No), if the correction information creating object H23 located at the intersection C23 is not the store A, that is, if the correction information creating object used to create the correction template is not the same object as the mark object (S306: No), the angular difference between the sign of the gas station XYZ at the intersection C22 and the sign of the store A at the intersection C21 is calculated (S307). If the calculated angular difference is less than the angular difference between the correction information creating object H23 located at the intersection C23 and the sign of the store A located at the intersection C21 (S307: Yes), a correction template is created using the correcting image of the gas station XYZ (S308 to S310).

However, if the calculated angular difference is equal to or greater than the angular difference between the correction information creating object H23 located at the intersection C23 and the sign of the store A located at the intersection C21 (S307: No), a correction template is not created using the correcting image of the gas station XYZ at the intersection C22. That is, the correction template is not updated, and the correction template created using the sign of the store A at the intersection C23 is kept.

It is assumed here that the vehicle 2 has reached the guidance execution point P21 at which the distance to the intersection C21, i.e., the guidance point, is equal to the prescribed distance (e.g., 300 meters) (S111: Yes). The store A, i.e., the mark object M21, is located at the intersection C21 (S112: Yes), and the correction template based on recognition of the sign of the store A is stored in the information storage unit 80 (S113: Yes). Therefore, image recognition processing is performed using the correction template (S114). Note that correcting the recognition template based on the color correction information conversely risks a reduced recognition rate of the mark object. Therefore, if the store A cannot be recognized using the correction template (S115: No), image recognition processing is performed using the recognition template not corrected by the color correction information (S116). If the store A can be recognized by the image recognition processing (S115: Yes or S117: Yes), guidance related to the intersection C21 such as "Turn right ahead at the store A intersection" is performed using the mark object M21 (S118). If the store A cannot be recognized by the image recognition processing (S117: No), guidance related to the intersection C21 such as "Turn right at the intersection 300 meters ahead" is performed using the distance to the intersection C21 (S119).

Note that, because there is a high possibility that the mark object can be recognized by performing image recognition processing using the correction template corrected by the color correction information, image recognition processing using the correction template is preferably performed before image recognition processing using the recognition template, thereby shortening the processing time.

As described in detail above, the in-vehicle device 1 specifies the mark object that serves as a marker for a guidance point on the set route (S103), and acquires the coloration information related to the coloration of the mark object (S104). Based on the coloration information, the correction information creating object before the mark object on the route having a coloration similar to the coloration of the mark object is specified (S205). In addition, an image of the correction information creating object when the vehicle 2 travels the route is acquired as the correcting image (S308). Based on the acquired color information related to the colors acquired by analyzing the acquired correcting image and based on existing pre-stored color information related to the colors of the correction information creating object, the color correction information related to correcting the colors of the pre-stored recognition template used for recognizing the mark object is calculated (S309). The recognition template is then corrected based on the calculated color correction information to create the correction template (S310). Thus, based on the image of the correction information creating object before the mark object during travel, the correction template is created by correcting the recognition template used for recognizing the mark object. Therefore, the colors of the correction template more closely reflect the actual appearance of the mark object, and can improve the recognition accuracy of the mark object.

If the correction template is created (S113: Yes), the mark object is recognized using the correction template (S114). If the mark object cannot be recognized using the correction template (S115: No), the mark object is recognized using the recognition template prior to correction based on the color correction information (S116). By thus correcting the recognition template, a reduction in recognition accuracy can be suppressed. In addition, there is a high possibility that the mark object can be recognized using the correction template. Therefore, by performing image recognition processing using the correction template first, a shorter processing time compared to performing image recognition processing using the correction template later can be expected.

If the distance to the correction information creating object is equal to or less than the prescribed distance (S106: Yes), image recognition processing is performed on the image of the surrounding area of the vehicle (S107), and it is determined whether the correction information creating object can be recognized (S108). If it is determined that the correction information creating object can be recognized (S108: Yes), the image of the correction information creating object is acquired as the correcting image based on the surrounding area image (S109). Thus, the correcting image can be suitably acquired.

The correction template is updated in the following cases.

If a correction information creating object closer to the mark object than the correction information creating object used in the creation of the already created correction template is the same object as the mark object (S302: Yes), the same object is used to newly create the correction template (S310). Thus, because the correction template is created based on the same object as the mark object, the recognition accuracy of the mark object can be further improved.

If the first prescribed time since creation of the already created correction template has elapsed (S303: Yes), the correction template is newly created using a correction information creating object located closer to the mark object than the correction information creating object used in the creation of the already created correction template (S310). Thus, because the correction template is created in consideration of changes in the appearance of the mark object due to the passage of time, the recognition accuracy of the mark object can be further improved.

In addition, the prescribed time is set depending on the time period during which the mark object is recognized. Specifically, if recognition of the mark object occurred during the early morning or evening time (S304: Yes) and the second prescribed time shorter than the first prescribed time has elapsed (S305: Yes), the correction template is newly created using a correction information creating object located closer to the mark object than the correction information creating object used in the creation of the already created correction template (S310). Thus, because the prescribed time is set short during time periods when the appearance of the mark object can dramatically change in a short period of time such as the early morning or evening, the recognition template is corrected to colors that more closely reflect the actual appearance of the mark object, which can further improve the recognition accuracy of the mark object. In addition, setting the prescribed time long during time periods when the appearance of the mark object does not change much over the passage of time, such as in the afternoon or at night, can lighten the computation load.

In comparison with the angular difference between the placement angle of the correction information creating object used to create the already created correction template and the placement angle of the mark object, if there is a smaller angular difference between the placement angle of the correction information creating object closer to the mark object than the correction information creating object used to create the already created correction template and the placement angle of the mark object (S307: Yes), the correction template is newly created using the correction information creating object that has a smaller angular difference with the mark object (S310). By thus considering changes in the appearance of the mark object due to the angle at which the mark object is placed, the recognition accuracy of the mark object can be improved. Note that the direction in which the mark object is placed, i.e., the angle of the mark object with respect to the sun, affects the appearance of the mark object more than the angle of the mark object with respect to the route. Therefore, in the present embodiment, the angular difference between the placement angles of the mark object and the correction information creating object are specified with respect to the direction of placement rather than the angle with respect to the route.

In the present embodiment, the control unit 10 of the in-vehicle device 1 constitutes a mark object specification unit, a coloration information acquisition unit, a correction information creating object specification unit, an image acquisition unit, a color correction information calculation unit, a correction template creation unit, a post-correction image recognition unit, a pre-correction image recognition unit, and a recognition determination unit. Referring to FIG. 2, the function of the mark object specification unit corresponds to the processing at S103, and the function of the coloration information acquisition unit corresponds to the processing at S104. Referring to FIG. 4, the function of the correction information creating object specification unit corresponds to the processing at S205. The function of the image acquisition unit corresponds to the processing at S109. Referring to FIG. 5, the function of the color correction information calculation unit corresponds to the processing at S309, and the function of the correction template creation unit corresponds to the processing at S310. Referring to FIG. 3, the function of the post-correction image recognition unit corresponds to the processing at S114, the function of the pre-correction image recognition unit corresponds to the processing at S116. The function of the recognition determination unit corresponds to the processing at S108.

The present invention is not limited to the embodiment described above, and may be implemented in various embodiments within a range that does not depart from the spirit of the invention.

(A) Angular Difference Between Mark Object and Correction Information Creating Object In the embodiment described above, if the correction information creating object is not the same object as the mark object (S302: No) and the correction information creating object used to create the already created correction template is the same object as the mark object (S306: Yes), regardless of the angular difference with the mark object, the correction template is not newly created and updating of the correction template is not performed. In another embodiment, the determination processing at S306 is omitted. Thus, regardless of whether the correction information creating object is the same object as the mark object, if the angular difference between the placement angle of that particular correction information creating object and the placement angle of the mark object is less than the angular difference between the placement angle of the correction information creating object used to create the already created correction template and the placement angle of the mark object (S307: Yes), the correction template is newly created.

Figure 5:
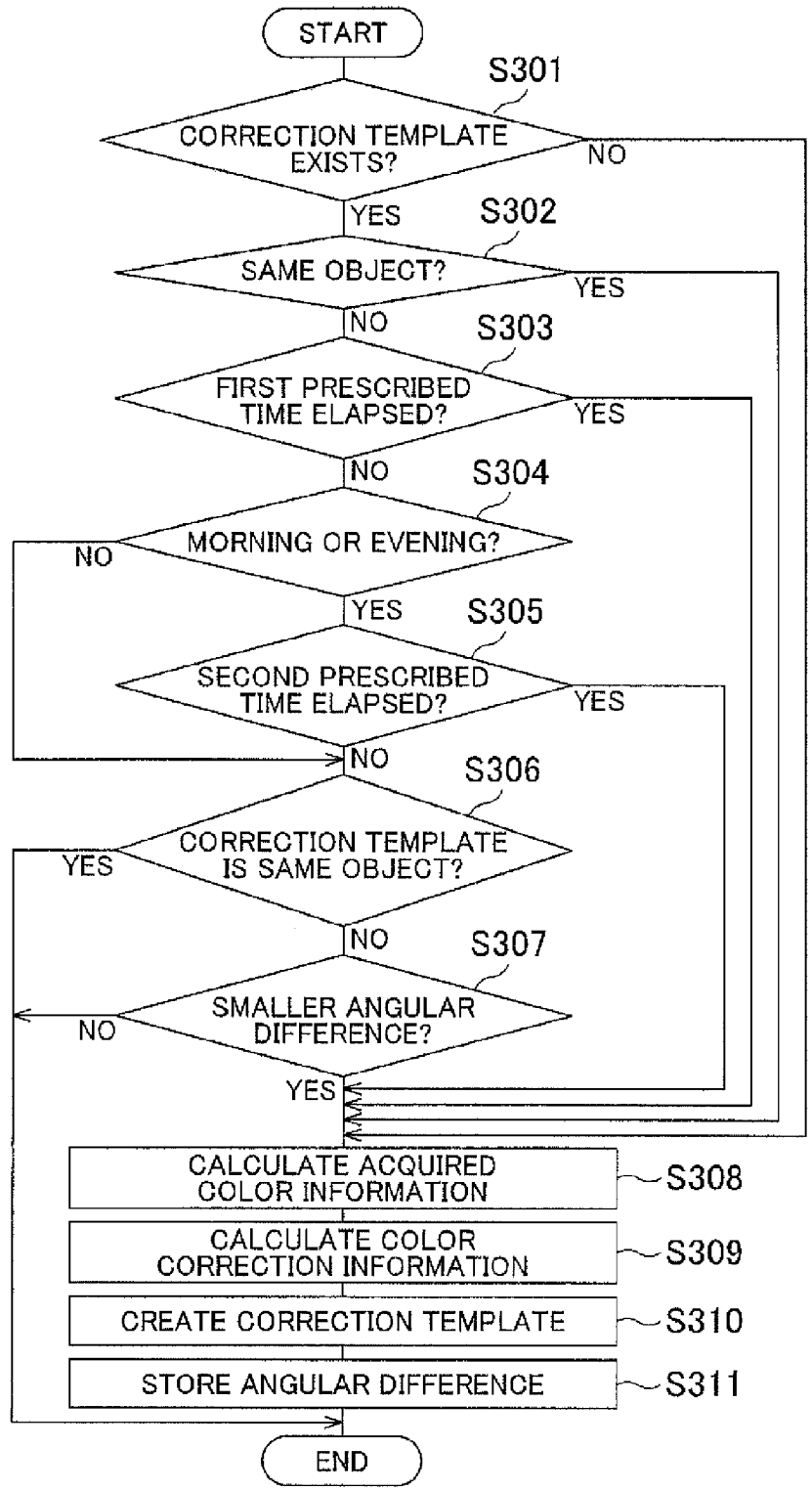
FIG. 5 is a flowchart that illustrates a correction template creation process according to the embodiment of the present invention.

Note that the processing at S301 to S307 in FIG. 5 may be partially or wholly omitted, or changed in sequence.

B) Similar Coloration

In the embodiment described above, the coloration of the recognition template is specified per area and it is determined whether the coloration is similar. In another embodiment, information that specifies the sign of the store A is constituted from red, white, and orange, for example, may be associated with the recognition template as the coloration information and stored in advance. The determination of similar coloration may be made based on such coloration information. It may be determined that the coloration is similar if the difference between the RGB values with respect to the coloration for each area is under a prescribed value (e.g., 10 percent). In addition, information related to coloration may be defined based on something other than RGB. As another example, although the coloration of the mark object is red, white, and orange, the coloration of the current landmark may be red, white, orange, and green. In such case, both may be considered to have similar coloration despite the current landmark including other colors in addition to the coloration of the mark object. Note that, if the coloration of the correction information creating object is more diverse than the coloration of the mark object, the acquired color information may be calculated for only the coloration of the mark object.

(C) Correction Template

In the embodiment described above, if the correction template is newly created, the correction template is updated by overwriting the already created correction template with the newly created template. In another embodiment, if the correction template is newly created, the newly created correction template may be separately stored without overwriting the already created correction template with the newly created template, and a plurality of correction templates may be maintained for the same mark object.

(D) In the embodiment described above, the control unit 10 of the in-vehicle device 1 constitutes the mark object specification unit, the coloration information acquisition unit, the correction information creating object specification unit, the image acquisition unit, the color correction information calculation unit, the correction template creation unit, the post-correction image recognition unit, the pre-correction image recognition unit, and the recognition determination unit. However, in another embodiment, a guidance program that carries out the functions of these units in a computer is conceivable, as well as a storage medium that stores such a guidance program. In addition, another embodiment may be a guidance method that performs processing including a mark object specification step, a coloration information acquisition step, a correction information creating object specification step, an image acquisition step, a color correction information calculation step, a correction template creation step, a post-correction image recognition step, a pre-correction image recognition step, and a recognition determination step.

The invention claimed is:

1. A guidance device for a vehicle, comprising:
   a processor configured to:
      specify a mark object that serves as a marker for a point that should be guided on a set route;
      acquire coloration information related to a coloration of the mark object;
      based on the coloration information, specify a correction information creating object located on the route before the mark object, the correction information creating object having a coloration similar to the coloration of the mark object;
      acquire an image of the correction information creating object during travel on the route as a correcting image;
      based on acquired color information related to a color obtained by analyzing the acquired correcting image and based on existing pre-stored color information related to a color of the correction information creating object, calculate color correction information related to correcting a color of a pre-stored recognition template used for recognizing the mark object;
      create a correction template by correcting the recognition template based on the color correction information; and
      recognize the mark object using:
         the correction template; or
         the recognition template prior to correction based on the color correction information when the mark object cannot be recognized by using the correction template.

2. The guidance device according to claim 1, wherein the processor is configured to:
   perform image recognition processing on an image of a surrounding area of the vehicle when a distance to the correction information creating object is equal to or less than a prescribed distance; and
   determine whether the correction information creating object can be recognized; and
   acquire the image of the correction information creating object based on the image of the surrounding area as the correcting image if it is determined that the correction information creating object can be recognized.

3. The guidance device according to claim 1, wherein the processor is configured to:
   if there is an object identical to the mark object closer to the mark object than the correction information creating object used to create the already created correction template, newly create the correction template using the identical object.

4. The guidance device according to claim 1, wherein the processor is configured to:
   if a prescribed time has elapsed since creation of the already created correction template, newly create the correction template using the correction information creating object located closer to the mark object than the correction information creating object used to create the already created correction template.

5. The guidance device according to claim 4, wherein the prescribed time is set depending on a time period during which the mark object is recognized.

6. The guidance device according to claim 1, wherein the processor is configured to:
   in comparison with an angular difference between a placement angle of the correction information creating object used to create the already created correction template and a placement angle of the mark object, if there is a smaller angular difference between a placement angle of the correction information creating object closer to the mark object than the correction information creating object used to create the already created correction template and the placement angle of the mark object, newly create the correction template using the correction information creating object that has the smaller angular difference with the mark object.

7. A guidance method for a vehicle, comprising the steps of:
   specifying a mark object that serves as a marker for a point that should be guided on a set route;
   acquiring coloration information related to a coloration of the mark object;
   specifying, based on the coloration information, a correction information creating object located on the route before the mark object, the correction information creating object having a coloration similar to the coloration of the mark object;

acquiring an image of the correction information creating object during travel on the route as a correcting image;

calculating, based on acquired color information related to a color obtained by analyzing the acquired correcting image and based on existing pre-stored color information related to a color of the correction information creating object, color correction information related to correcting a color of a pre-stored recognition template used for recognizing the mark object;

creating a correction template by correcting the recognition template based on the color correction information; and recognizing the mark object using:
  the correction template; or
  the recognition template prior to correction based on the color correction information when the mark object cannot be recognized by using the correction template.

8. A non-transitory computer-readable medium storing a computer executable guidance program for a vehicle that causes a computer to perform the functions of:

specifying a mark object that serves as a marker for a point that should be guided on a set route;

acquiring coloration information related to a coloration of the mark object;

specifying, based on the coloration information, a correction information creating object located on the route before the mark object, the correction information creating object having a coloration similar to the coloration of the mark object;

acquiring an image of the correction information creating object during travel on the route as a correcting image;

calculating, based on acquired color information related to a color obtained by analyzing the acquired correcting image and based on existing pre-stored color information related to a color of the correction information creating object, color correction information related to correcting a color of a pre-stored recognition template used for recognized the mark object;

creating a correction template by correcting the recognition template based on the color correction information; and recognizing the mark object using:
  the correction template; or
  the recognition template prior to correction based on the color correction information when the mark object cannot be recognized by using the correction template.

* * * * *